No. 839,790. PATENTED DEC. 25, 1906.
W. M. SMITH.
NUT LOCK.
APPLICATION FILED APR. 11, 1906.
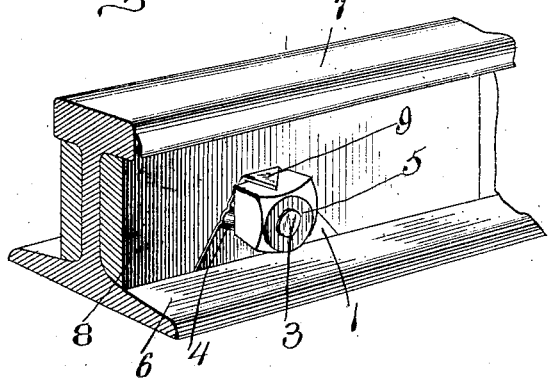
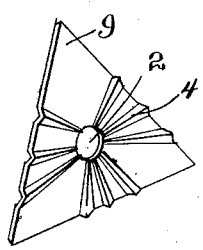
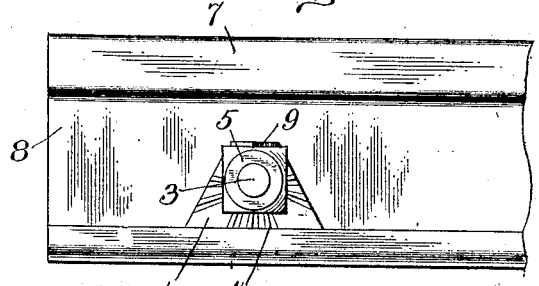
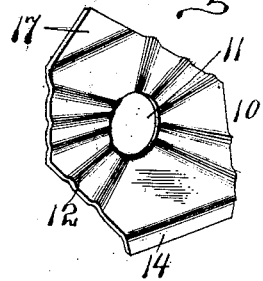
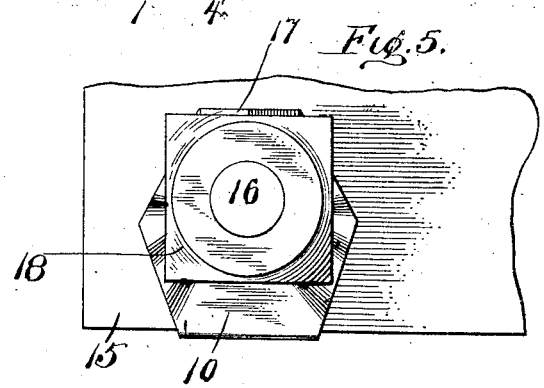
Witnesses:
Jesse C. Miller.
Inventor:
William M. Smith.
by Attorneys.

UNITED STATES PATENT OFFICE.

WILLIAM M. SMITH, OF TURTLE CREEK, PENNSYLVANIA.

NUT-LOCK.

No. 839,790.         Specification of Letters Patent.         Patented Dec. 25, 1906.

Application filed April 11, 1906. Serial No. 311,096.

*To all whom it may concern:*

Be it known that I, WILLIAM M. SMITH, a citizen of the United States of America, residing at Turtle Creek, in the county of Allegheny and State of Pennsylvania, have invented certain new and useful Improvements in Nut-Locks, of which the following is a specification, reference being had therein to the accompanying drawings.

This invention relates to certain new and useful improvements in nut-locks; and the invention has for its primary object to provide a novel form of washer adapted to be mounted upon the end of a bolt to prevent a nut from rotating upon said bolt.

Another object of this invention is to provide a nut-lock which will be simple and inexpensive to manufacture, positive in its action, and free from all danger of being injured while in use.

A further object of this invention is to provide a nut-lock particularly adapted for rail-joints where two fish-plates or splice-bars are secured to the confronting ends of two sections of rails by nuts and bolts. The vibrations of the rails caused by rolling-stock passing over the same tend to loosen nuts upon the ends of bolts and in a great many instances causing accidents, which otherwise would not occur if the nuts had not become detached from the ends of the bolts.

With the above and other objects in view, which will more readily appear as the nature of the invention is better understood, the same consists in the novel construction, combination, and arrangement of parts to be hereinafter more fully described and claimed, and, referring to the drawings accompanying this application, like numerals of reference designate corresponding parts throughout the several views, in which—

Figure 1 is a perspective view of a section of rail having two splice-bars secured thereto by a nut and bolt, the nut being retained upon the bolt by my improved nut-lock. Fig. 2 is a perspective view of my improved washer employed as a nut-lock. Fig. 3 is a front elevation of my improved nut-lock. Fig. 4 is a perspective view of a washer, illustrating a slightly-modified form of construction. Fig. 5 is a front elevation of the form of washer shown in Fig. 4 in position for locking a nut upon the end of a bolt.

To put my invention into practice, I construct my improved nut-locks in the form of washers which are stamped or sheared from sheet metal. The washer 1 (illustrated in Figs. 1 to 3 of the drawings) is triangular in plan and is provided with a central opening 2, whereby it may be mounted upon the threaded end 3 of a bolt. The washer is crimped or provided with corrugations 4, said corrugations radiating from the central opening 2 and serving to add resiliency to the washer 1, at the same time providing a rough surface which will tend to grip the material against which the washer bears and prevent the same from rotating.

When the washer 1 is employed to lock a nut 5 upon the screw-threaded end 3 of a bolt that is used in connection with a rail-joint, one of the edges of the washer is adapted to engage the base-flange 6 of a section of rail 7 and prevent said washer from rotating. After the nut 5 has been rotated upon the bolt to press the washer into engagement with one of the splice-bars 8 the upper end 9 of the washer is bent over upon one of the faces of the nut 5 to prevent said nut from rotating.

In Figs. 4 and 5 of the drawings I have illustrated a pentagon-shaped washer 10, which is provided with a central opening 11. The washer 10 is also corrugated similar to the washer 1, as at 12, and the principal difference between the washer 10 and the washer 1 resides in the fact that the one edge 14 of the washer 10 is bent to engage the edge 15 of a plate to prevent said washer from rotating upon a bolt 16, that passes through said plate. The washer is then bent, as at 17, to engage a nut 18, mounted upon the end of a bolt 16, said washer preventing the nut-lock from rotating upon said bolt.

My invention particularly resides in the radiating corrugations of the washers, together with the shape of said washers, which provides a locking edge in connection with each washer adapted to prevent said washers from rotating upon the ends of the bolts, while the bent portion of the washer is adapted to prevent a nut from rotating upon a bolt.

The washer in both forms of construction shown, it will be observed, is corrugated or crimped on only a part of its face, the corrugations extending radially from the central opening in the washer and being so arranged or disposed as to provide a corrugated portion, a smooth or uncorrugated portion, and other corrugated portion, and then another smooth or uncorrugated portion. In other words, the corrugated parts or portions of the face of the washer are in groups, being separated by smooth uncorrugated portions, as I have found in practice that such construction has decided advantages over the washer corrugated throughout the entire surface thereof. This advantage results from the fact that a washer corrugated only at certain portions of its surface, as shown and described by me, enables the turning or driving home of the nut a greater distance when brought in engagement with the corrugations where they are only on a part of the face of the washer than can be accomplished where these corrugations cover the entire face of the washer, as only a part of the inner face of the nut is in biting engagement with the corrugations of the washer instead of the entire face being in engagement with corrugations, which latter would be the case where the entire surface of the washer was corrugated. Thus it being possible to turn or screw the nut farther home on the bolt the corrugations are caused to bite into the inner face of the nut in such a manner as to most effectually hold the same in position on the bolt. Furthermore, the construction shown and described by me enables the turning of the nut for the reasons above stated so as to bring it into a desired position to permit the bending over of the lip or part of the washer onto the face of the nut. Again, I have found it of great advantage in practice to arrange the corrugations radially of the opening in the washer, as in such arrangement it is to be observed that in screwing home the nut the latter when being turned after being brought into engagement with the corrugations is not being turned directly against a considerable length of the sharp edge of the corrugation, but is gradually being engaged with a greater length of the corrugation as the nut is turned farther home, whereas if the corrugations were arranged horizontal or vertical throughout the face or surface of the washer the nut as it is turned has one edge thereof brought into direct contact throughout its length with the biting edge of a corrugation and the inner face of the nut is brought into direct engagement with all of the corrugation which the nut covers. It is to be observed in each of the two constructions shown by me that the corrugations are extended at an angle to vertical and horizontal lines drawn through the axis of the washer. Thus a greater portion of any one of the corrugations is gradually presented to the face of the nut as the latter is turned.

I do not care to confine myself to the material from which the washers are made; and such changes as are permissible by the appended claim may be resorted to without departing from the spirit and scope of the invention.

What I claim, and desire to secure by Letters Patent, is—

As an improved article of manufacture, a nut-lock consisting of a washer, each edge of which lies at an angle to each of the other edges, corrugations formed on the outer face of the washer and projecting radially from the central opening in the washer each on a line at an angle to vertical and horizontal lines through the axis of the washer, the said corrugations being arranged in groups on the face of the washer so as to leave smooth uncorrugated portions on the washer between the groups of corrugations, the said washer having a straight lower bearing edge, and so shaped as to have one corner project beyond and be bent over on the nut to be locked.

In testimony whereof I affix my signature in the presence of two witnesses.

WILLIAM M. SMITH.

Witnesses:
  E. E. POTTER,
  C. KLOSTERMANN.